United States Patent Office 3,642,781
Patented Feb. 15, 1972

3,642,781
SUBSTITUTED ACRYLIC ACIDS AND PROCESS
FOR THEIR PRODUCTION
Maximilian von Strandtmann, Rockway, Chester Puchalski, Dover, Marvin Cohen, New Milford, and John Shavel, Jr., Mendham, N.J., assignors to Warner-Lambert Company, Morris Plains, N.J.
No Drawing. Filed Oct. 15, 1968, Ser. No. 767,854
Int. Cl. C07d 27/56
U.S. Cl. 260—240 D                    1 Claim

ABSTRACT OF THE DISCLOSURE

Substituted acrylic esters or acids of type I are prepared by reaction of phosphonium ylids with a Mannich base followed by a Wittig reaction of the resulting substituted phosphorane (II) with aldehydes.

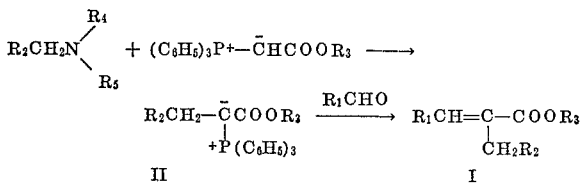

In the above scheme $R_1$ is a substituted or an unsubstituted aromatic nucleus, alkylidene or aralkylidene group, $R_2$ is a hydroxylated aromatic or heteroaromatic nucleus, substituted or unsubstituted indole, methyl aryl or methyl heteroaryl ketone, $R_3$ is H or lower alkyl. $R_4$ and $R_5$ are lower alkyl or taken together with the nitrogen atom to which they are attached form a piperidine, pyrrolidine, morpholine or piperazine ring. Claimed are compounds of type I, reduction products thereof, intermediates of type II and the process involving alkylation of phosphonium ylids with Mannich bases. These compounds are useful as anti-inflammatory agents.

The present invention relates to certain acrylic acids or esters which may be represented by the following structural formula:

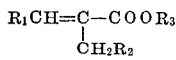

wherein $R_1$ is a substituted or an unsubstituted aromatic or heteroaromatic nucleus, lower alkylidene or aralkylidene, and $R_2$ is a hydroxylated aromatic or heteroaromatic radical, substituted or unsubstituted indole, methyl aryl or methyl heteroaryl ketone, and $R_3$ is hydrogen or lower alkyl.

In the above definitions of $R_1$, $R_2$ and $R_3$, aromatic nucleus represents ring systems, such as phenyl, and it in turn may be substituted by one or more of the following groups: for example, halo, lower alkoxy, lower alkyl, nitro, amino, and the like. Heteroaromatic nucleus represents groups such as pyridyl, furyl, indolyl and said heteroaromatic nucleus may also be substituted by one or more of the following groups: for example, lower alkyl, lower alkoxy, halo, nitro, amino, and the like. Examples of hydroxylated aromatic and heteroaromatic nucleus are, for example, 2-hydroxybenzene, 4-hydroxybenzene, 3,4-dihydroxybenzene, 2 or 1-hydroxynaphthalene, indole, 5-methoxy-2-methylindole, acetophenone, 3-acetylindole, and the like. Lower alkyl is meant to include straight or branched $C_1$ to $C_7$ carbon atoms.

The present invention also includes within its scope a novel process for the production of the above-described compounds.

The compounds of this invention are useful as anti-inflammatory agents. They may be used in an analogous fashion as cortisone. In other words, the compounds of this invention may be applied locally or used systemically to reduce inflammation in a mammal such as mice, rats, guinea pigs, etc., afflicted with inflammation. Generally speaking, a dose of 100 to 200 mg./kg. of the animal body weight is prescribed 2 or 3 times daily to produce the desired anti-inflammatory activity. When these compounds are used topically, they are combined with a dermatologically acceptable carrier, such as talc, vasoline, hydrous ointment and the like with the active ingredient being present from 1 to 10% by weight. In use, such topical applications are applied to an inflamed site liberally 2 to 3 times a day. Among the conditions which these compounds are particularly useful, are, for example, dematitis.

In order to administer these compounds orally, they are combined with pharmaceutically acceptable excipients, such as lactose, mannitol, dicalcium phosphate, and compounded into tablets, capsules, powders, according to known pharmacists's art.

According to the present invention, compounds of type I are prepared by reacting a Mannich base with a phosphonium ylid according to scheme:

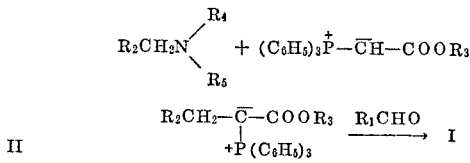

$R_4$ and $R_5$ in the above scheme are lower alkyl or taken together with the nitrogen form the pyrrolidine, piperidine, piperazine or morpholine ring.

Broadly speaking, the reactants are refluxed together in approximately equal molar ratio. The resulting new phosphonium ylids of type II, also included in the scope of this invention, readily undergo Wittig reaction with aldehydes to give compounds of type I. The acids of type I are prepared from corresponding esters by hydrolysis. The corresponding carboxylic acids are also within the scope of this invention.

This previously undisclosed process makes it possible to prepared β-aryl-acrylic acids having α-substitutent with a reactive nucleus such as indole or oxygenated benzene. Compounds of this type are not available by other methods.

Compounds of type I can be easily hydrogenated to compounds of type III which are also a feature of this invention. The hydrogenation can be effected according to the following reaction scheme:

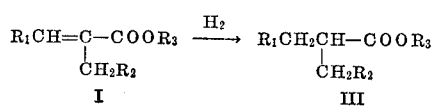

The hydrogenation may be effected by known methods according to the art. Compounds of type III are also useful as anti-inflammatory agents and they are to be used according to the description given above.

The phosphonium ylids and the aldehydes used are available from commercial sources, for example, Aldrich Chemical Company. The Mannich bases are prepared according to standard methods as described in "α-Aminoalkylierung" by Hellmann and Opitz, Verlag Chemie. G.m.b.H., Weinheim, 1960.

The following examples are included in order further to illustrate the invention.

EXAMPLE 1

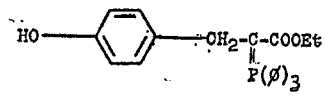

Ethyl p-hydroxy - α - (triphenylphosphoranylidene)hydrocinnamate: This was prepared in analogous fashion to ethyl α - (triphenylphosphoranylidene)indole - 3 - propionate from 6.04 g. of α-dimethylamino-p-cresol, and 14 g. of (carbethoxymethylene) - triphenylphosphorane. The material was recrystallized from ethyl acetate. M.P. 203–06°; yield 16 g. (89%); λ_max. mμ (ε) 224 (34,000), 265 (4,670); λ_max. 685 (ms.), 710 (ms.), 750 (ms.), 835 (m.), 1060 (ms.), 1100 (ms.), 1150 (s.), 1230 (ms.), 1265 (ms.), 1510 (ms.), 1565 (s.), 3200 (ms.) cm.$^{-1}$.

Analysis.—Calcd. for $C_{29}H_{27}O_3P$ (percent): C, 76.64; H, 5.99; P, 6.81. Found (percent): C, 76.54; H, 5.92; P, 6.60.

EXAMPLE 2

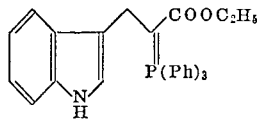

Ethyl α - (triphenylphosphoranylidene)indole - 3 - propionate: A solution of 25 g. (0.143 m.) of gramine and 50 g. (0.143 m.) of (carbethoxymethylene)triphenylphosphoran) in 725 ml. of toluene was refluxed for 6 hrs. with protection from moisture and a dry nitrogen sweep through the condenser. After standing overnight, the crystalline product was filtered off, and washed consecutively with toluene and petroleum ether. Yield 63.5 g. (92%) recrystallization from ethyl-acetate afforded analytical material, M.P. 187–89° C.

Analysis.—Calcd. for $C_{31}H_{28}NO_2P$ (percent): C, 77.97; H, 5.91; N, 2.92; P, 6.49. Found (percent): C, 78.27; H, 5.90; N, 2.86; P, 6.44. γ_max. 3400 (w.), 1610 (s), 13.15 (s.), 1150 (s.), 1056 (s), 735 (s.), 710 (m.), 687 (m.), cm.$^{-1}$ ε mμ max. (λ_max.) 221 (61,800); 273 (7,300); 290 (5,200).

EXAMPLE 3

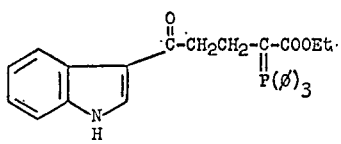

Ethyl α - (triphenylphosphoranylidene)indole - 3 - glutaraldehydate: The solution of 44 g. of (carbethoxymethylene) - triphenylphosphorane, and 23 g. of 3-(β-dimethylaminopropionyl)indole in 600 ml. of toluene was refluxed under a stream of nitrogen for 7 hrs. and allowed to stand overnight at room temperature. The toluene was removed under reduced pressure, and the residual gum was recrystallized from $CH_3CN$, M.P. 189–92°; yield 28 g. (42%); λ_max. 260 (13,000); 298 (13-800). γ_max. 685 (m.), 750 (ms.), 965 (mw.), 1075 (m.), 1100 (ms.), 1160 (m.), 1285 (ms.), 1590 (s.), 1640 (ms.) cm.$^{-1}$.

Analysis.—Calcd. for $C_{33}H_{30}NO_3P$ (percent): C, 76.29; H, 5.82; N, 2.70; P, 5.96. Found (percent): C, 76.03; H, 5.81; N, 2.85; P, 5.73.

EXAMPLE 4

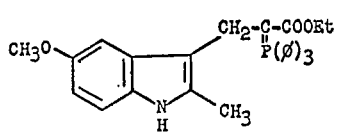

Ethyl 5 - methoxy - 2 - methyl - α - (triphenylphosphoranylidene)indole - 3 - propionate: This was prepared from 4.4 g. of 3 - [(dimethylamino)methyl]5-methoxy-2-methylindole, and 7 g. of (carbethoxymethylene) - triphenylphosphorane in analogous fashion to ethyl α-(triphenylphosphoranylidene)indole - 3 -propionate. The material was recrystallized from $CH_3CN$, M.P. 190–93°; yield 9 g. (87%); λ_max. mμ (ε) 269 (9,700), 306 (10,000); γ_max. 685 (m.), 705 (m.), 750 (m.), 1070 (ms.), 1095 ,ms.), 1125 (m.), 1215 (ms.), 1250 (m.), 1600 (s.), 3300 (ms.), cm.$^{-1}$.

Analysis.—Calcd. for $C_{33}H_{32}NO_3P$ (percent): C, 75.99; H, 6.18; N, 2.69; P, 5.94. Found (percent): C, 76.05; H, 6.09; N, 2.50; P, 5.99.

EXAMPLE 5

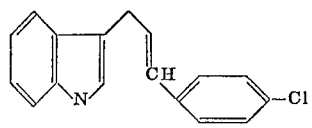

Trans - p - chloro - α - (indol - 3 - ylmethyl)cinnamic acid: This was prepared from 40 g. (0.084 m.) of ethyl α - (triphenylphosphoranylidene)indole - 3 - propionate and 11.8 g. (0.084 m.) of p-chlorobenzaldehyde in analogous fashion to α[(4-biphenylyl)methylene]indole-3-propionic acid. The crude reaction product (29 g.) crystallized from 150 ml. of benzene to yield 13.45 g. (52%) of acid M.P. 189–96°. Recrystallization from acetonitrile gave analytical material M.P. 198.5–200°; λ_max. mμ (ε) 222 (45,800); 271 (26,000); γ_max. 3550 (m.), 1675 (s.), 1595 (m.), 1282 (ms.), 1270 (ms.), 1085 (m.), 1007 (m.), 742 (ms.), 735 (m.) cm.$^{-1}$.

Analysis.—Calcd. for $C_{18}H_{14}NO_2Cl$ (percent): C, 69.35; H, 4.53; N, 4.49; Cl. 11.37. Found (percent): C, 69.37; H, 4.71; N, 4.35; Cl, 11.27.

EXAMPLE 6

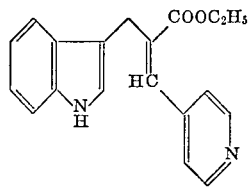

Ethyl trans-α-(4-pyridylmethylene)indole-3-propionate: A solution of 30.5 g. (0.064 m.) of ethyl α-(triphenylphosphoranylidene)indole-3-propionate and 6.9 g. (0.064 m.) of 4-pyridinecarboxaldehyde in 250 ml. of dioxane was refluxed for 21 hrs. and evaporated under reduced pressure. The residual gum was dissolved in 200 ml. of ether and the solution was extracted with three 50 ml. portions of 4 N HCl. The acid solution was made basic with 5% NaOH solution and extracted with chloroform to afford 22 g. of crude product upon evaporation. Crystallization from 100 ml. of ether yielded 10.6 g. (54%). Recrystallization from 50% aqueous ethanol gave analytical material m.p. 127–28°; λ_max. mμ (ε) 220 (40,000), 258 (19,000); γ_max. 740 (ms.), 1070 (m.), 1202 (ms.), 1257 (ms.), 1600 (w.), 1710 (s.), 3150 (m.) cm.$^{-1}$.

Analysis.—Calcd. for $C_{19}H_{18}N_2O_2$ (percent): C, 74.49; H, 5.92; N, 9.15. Found (percent): C, 74.60; H, 5.90; N, 9.23.

EXAMPLE 7

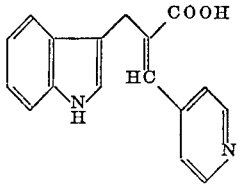

Trans-α-(4-pyridylmethylene)indole-3 - propionic acid: A solution of 8.3 g. (0.027 m.) of ethyl α-(4-pyridylmethylene)indole-3-propionate and 5 g. of potassium hydroxide in 125 ml. of 50% ethanol was refluxed for 4 hrs. Ethanol was distilled off and the aqueous residue was diluted to 100 ml. with water. After washing with two 50 ml. portions of ether, the aqueous solution was chilled and treated with 4 N HCl to pH 5.6. The resulting precipitate was filtered off and crystallized from 50% ethanol to yield 3.1 g. (41%) of amino acid. Recrystallization from methanol gave analytical material m.p. 229–31°

(dec.) λ_max. mµ (ε) 221 (42,500), 258 (19,100); γ_max. 730 (s.), 1013 (m.), 1090 (mw.), 1605 (m.), 1630 (w.), 1680 (m.), 3300 (m.) cm.$^{-1}$.

*Analysis.*—Calcd. for $C_{17}H_{14}N_2O_3$ (percent): C, 73.36; H, 5.07; N, 10.07. Found (percent): C, 73.34; H, 5.08; N, 9.99.

EXAMPLE 8

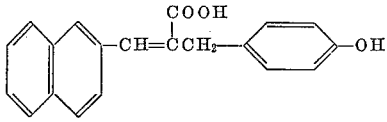

Trans-p-hydroxy-α-[(2 - naphthyl)methylene]hydrocinnamic acid: This was prepared from 18 g. of ethyl-p-hydroxy - α - (triphenylphosphoranylidene)hydrocinnamate, and 6.2 g. of 2-naphthaldehyde in analogous fashion to α-[(4-biphenylyl)methylene] - p - hydroxyhydrocinnamic acid. The material was recrystallized from CH$_3$CN, m.p. 209–12.5°; yield 6 g. (50%); λ_max. mµ (ε) 223 (23,200), 259 (36,300), 301 (16,250); γ_max. 740 (mw.), 800 (mw.), 940 (w.), 1200 (ms.), 1260 (ms.), 1510 (m.), 1610 (m.), 1660 (s.), 3400 (ms.) cm.$^{-1}$.

*Analysis.*—Calcd. for $C_{20}H_{16}O_3$ (percent): C, 78.93; H, 5.30. Found (percent): C, 78.93; H, 5.23.

EXAMPLE 9

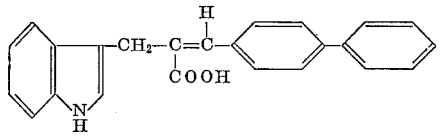

Trans-α-[(4 - biphenylyl)methylene]indole-3-propionic acid: A solution of 20 g. of ethyl α-(triphenylphosphoranylidene)indole-3-propionate, and 8 g. of 4-biphenylcarboxaldehyde in 300 ml. of dioxane was refluxed for 24 hrs. The dioxane was removed under reduced pressure and the residual gum was taken up in 100 ml. of 1:1 ethanol: H$_2$O. The solution was heated with 8 g. of KOH and refluxed for 4 hrs. The ethanol was removed from the hydrolysis mixture under reduced pressure, and the aqueous residue was diluted to ca. 100 ml. with H$_2$O. The aqueous mixture was extracted 5 times with 50 ml. portions of ether, made acidic with conc HCl, and extracted 3 times with 50 ml. portions of ethyl acetate. Combined ethyl acetate extracts were dried over Na$_2$SO$_4$, and taken down to a semicrystalline residue under reduced pressure. The residue was recrystallized from abs ethanol, m.p. 216–18°; yield 5 g. (34%): γ_max. mµ (ε) 221 (49,500), 291 (35,200); λ_max. 690 (mw.), 735 (ms.), 840 (mw.), 905 (mw.), 1000 (mw.), 1185 (mw.), 1220 (m.), 1290 (m.), 1620 (m.), 1680 (s.), 3400 (m.), 3475 (m.) cm.$^{-1}$.

*Analysis.*—Calcd. for $C_{24}H_{19}NO_2$ (percent): C, 81.56; H, 5.42; N, 3.96. Found (percent): C, 81.29; H, 5.46; N, 3.98.

EXAMPLE 10

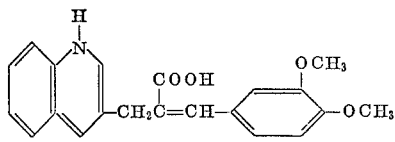

Trans-α-veratrylidene indole-3-propionic acid: A solution of 20 g. of ethyl α-(triphenylphosphoranylidene)indole-3-propionate and 7 g. of veratraldehyde was refluxed for 24 hrs. The dioxane was removed under reduced pressure, and the residue was taken up in 100 ml. of 50% ethanol. The solution was heated with 8 g. of KOH, and the mixture was refluxed for 4 hrs. The ethanol was removed under reduced pressure and the concentrate was diluted to a ca. 100 ml. with H$_2$O. The aqueous mixture was extracted with 50 ml. portions of ether. The aqueous phase was made acidic with conc. HCl and extracted with four 50 ml. portions of ethyl acetate. A crystalline precipitate that formed in the combined ethyl acetate extracts was filtered, and recrystallized from abs ethanol m.p. 186–89°; yield 2.7 g. (19%); λ_max. mµ (ε) 223, (45,500), 283 (20,300), 289 (19,600); 304–10 (plat) (14,300); γ_max. 730 (ms.), 1015 (m.), 1140 (ms.), 1160 (ms.), 1240 (ms.), 1260 (s.), 1510 (ms.), 1590 (ms.), 1650 (s.), 3400 (m.) cm.$^{-1}$.

*Analysis.*—Calcd. for $C_{20}H_{19}NO_4$ (percent): C, 71.20; H, 5.68; N, 4.15. Found (percent): C, 70.98; H, 5.55; N, 4.10.

EXAMPLE 11

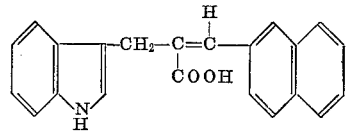

Trans - α - [(2 - naphthyl)methylene]indole - 3 - propionic acid: This was prepared from 20 g. of ethyl α-(triphenylphosphoranylidene)indole - 3 - propionate and 6.5 g. of 2-naphthaldehyde in analogous fashion to α-[(4 - biphenylyl)methylene]indole - 3 - propionic acid. The material was recrystallized from abs ethanol, M.P. 211–13°; yield 7.5 g. (55%); λ_max. mµ (ε) 211 (49,600), 222 (49,600, (259 (40,800), 291 (19,800); γ_max. 735 (ms.), 810 (m.), 900 (m.), 1090 (m.), 1210 (m.), 1250 (ms.), 1275 (ms.), 1620 (m.), 1680 (s.), 3400 (ms.) cm.$^{-1}$.

*Analysis.*—Calcd. for $C_{22}H_{17}NO_2$ (percent): C, 80.71; H, 5.23; N, 4.20. Found (percent): C, 80.75; H, 5.20; N, 4.11.

EXAMPLE 12

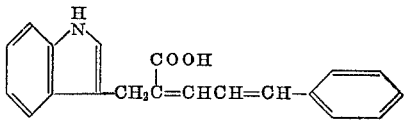

Trans - α - cinnamylidene indole - 3 - propionic acid: A solution of 20 g. of ethyl α-(triphenylphosphoranylidene) indole-3-carboxylate, and 5.6 g. of cinnimildehyde in 300 ml. of dioxane was refluxed for 24 hr. The dioxane was removed under reduced pressure and the residue was taken up in 100 ml. of 50% ethanol. The solution was heated with 8 g. of KOH and refluxed for 4 hr. The ethanol was removed under reduced pressure, and the concentrate was diluted to ca 100 ml. with H$_2$O. The aqueous mixture was extracted with four 50 ml. portions of ether, made acid with conc HCl, and extracted with four 50 ml. portions of ethyl acetate. A crystalline precipitate which formed in the combined ethyl acetate extracts was filtered, and recrystallized from ethyl acetate, M.P. 240–42°; yield 7 g. (55%); λ_max. mµ (ε) 223 (40,500), 312 (35,000); γ_max. 730 (m.), 970 (m.), 1260 (m.), 1280 (m.), 1625 (m.), 1675 (s.), 3420 (m.) cm.$^{-1}$.

*Analysis.*—Calcd. for $C_{20}H_{17}NO_2$ (percent): C, 79.18; H, 5.65; N, 4.62. Found (percent): C, 79.09; H, 5.72; N, 4.58.

EXAMPLE 13

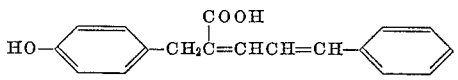

Trans - 2 - (p - hydroxybenzyl) - 5 - phenyl - 2,4-pentadienoic acid: A solution of 5.28 g. of cinnamaldehyde, and 18 g. of ethyl p - hydroxy - α - (triephenylphosphoranylidene)hydrocinnamate in 300 ml. of dioxane was refluxed for 24 hr. The dioxane was removed under reduced pressure and the residue was taken up in 100 ml. of 50% ethanol. The solution was treated with 8 g. of KOH and refluxed for 4 hr. The solution was removed under reduced pressure and the concentrate was diluted to ca. 100 ml. with H$_2$O. The aqueous mixture was extracted with four 50 ml. portions of ether. The aqueous phase was made strongly acidic with conc. HCl, and the precipitated product was filtered, washed with cold H₂O, and recrystallized from abs. ethanol, M.P. 236–39.5°; yield 6 g. (53%); λ_max. mμ (ε) 226 (14,000), 241 (7,900), 316 (39,800); γ_max. 730 (m.), 785 (mw.), 985 (m.), 1100 (mw.), 1165 (m.), 1215 (ms.), 1275 (ms.), 1515 (ms.), 1590 (ms.), 1610 (ms.), 1665 (ms.), 3400 (m.) cm.⁻¹.

*Analysis.*—Calcd. for C₁₈H₁₆O₃ (percent): C, 77.12; H, 5.75. Found (percent): C, 77.40; H, 5.89.

EXAMPLE 14

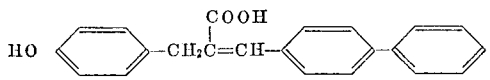

Trans - α - [(4 - biphenylyl)methylene] - p - hydroxyhydrocinnamic acid: A solution of 18 g. of ethyl - p-hydroxy - α - (triphenylphosphoranylidene)hydrocinnamate and 7.24 g. of 5-biphenylcarboxaldehyde in 300 ml. of dioxane was refluxed for 24 hr. The dioxane was removed under reduced pressure, and the residue was taken up to 100 ml. of 50% ethanol. The solution was treated with 8 g. of KOH and refluxed for 4 hr. The ethanol was removed under reduced pressure, and the concentrate was diluted to ca. 100 ml. with H₂O. The aqueous mixture was extracted with four 50 ml. portions of ether. The aqueous phase was made strongly acidic with conc. HCl, and the crystalline precipitate that formed was filtered, washed with cold H₂O, and recrystallized from abs. ethanol, M.P. 229–30°; yield 7 g. (53%); λ_max. mμ (ε) 295 (30,400); γ_max. 760 (m.), 825 (w.), 950 (w.), 1000 (w.), 1200 (m.), 1260 (m.), 1510 (ms.), 1600 (m.), 1610 (m.), 1670 (s.), 3420 (ms.) cm.⁻¹.

*Analysis.*—Calcd. for C₂₂H₁₈O₃ (percent): C, 79.98; H, 5.49. Found (percent): C, 79.80; H, 5.48.

EXAMPLE 15

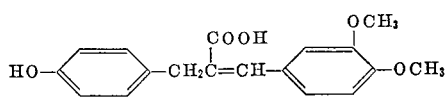

Trans - p - hydroxy - α - veratrylidenehydrocinnamic acid: This was prepared from 18 g. of ethyl p - hydroxy-α(triphenylphosphoranylidene)hydrocinnamate, and 6.64 g. of veratraldehyde in analogous fashion to α - [(4 - biphenylyl(methylene] - p - hydrohydrocinnamic acid. The material was recrystallized from ethyl acetate, M.P. 180–85°; yield 4.5 g. (36%); λ_max. mμ (ε) 222 (21,600), 287 (17,000), 309 (16,100); γ_max. 756 (mw.), 795 (ms.), 840 (m.), 915 (m.), 1010 (s.), 1135 (s.), 1160 (s.), 1220 (s.), 1260 (s.), 1510 (s.), 1600 (s.), 1660 (s.), 3500 (ms.) cm.⁻¹.

*Analysis.*—Calcd. for C₁₈H₁₈O₅ (percent): C, 68.78; H, 5.77. Found (percent): C, 68.92; H, 5.85.

EXAMPLE 16

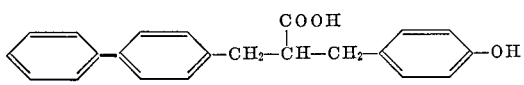

2 - [(4 - biphenylyl)methyl] - p - hydroxyhydrocinnamic acid: To a solution of 8 g. of α-[(4-biphenylyl)-methylene]-p-hydroxyhydrocinnamic acid in 250 ml. of abs. ethanol, 0.5 g. of 10% pd./c. was added, and the mixture reduced at atmospheric pressure, and room temperature. Hydrogen uptake was complete in 3 hrs. The mixture was filtered free of catalyst and the filtrate evaporated to dryness under reduced pressure. The crystalline residue was recrystallized from abs. ethanol, M.P. 189–91.50; yield 6 g. (75%); λ_max. mμ (ε) 229 (9,220), 253 (15,500); γ_max. 680 (m.), 775 (s.), 825 (ms.), 990 (m.), 1155 (ms.), 1225 (s.), 1260 (s.), 1515 (s.), 1600 (m.), 1615 (m.), 1700 (s.), 3100 (s.) cm.⁻¹.

*Analysis.*—Calcd. for C₂₂H₂₀O₃ (percent): C, 79.49; H, 6.06. Found (percent): C, 79.58; H, 6.12.

EXAMPLE 17

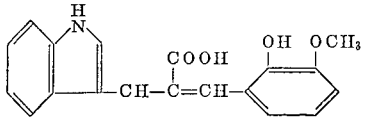

α - (2 - hydroxy - 3 - methoxybenzylidene)indole - 3-propionic acid: This was prepared from 23.8 g. of ethyl α - (triphenylphosphoranylidene)indole - 3 - propionate, and 7.6 g. of o-vanillin in analogous fashion to α-(2-naphthylmethylene)indole-3-propionic acid. The material was recrystallized from CH₃CN, M.P. 203–05°; yield 7.5 g. (47%); λ_max. mμ (ε) 224 (54,000), 275 5(18,200); γ_max. 720 (m.), 740 (s.), 960 (m.), 1060 (m.), 1240 (ms.), 1255 (s.), 1610 (m.), 1670 (s.), 3400 (s.) cm.⁻¹.

*Analysis.*—Calcd. for C₁₉H₁₇NO₄ (percent): C, 70.57; H, 5.30; N, 4.33. Found (percent): C, 70.77; H, 5.34; N, 4.26.

EXAMPLE 18

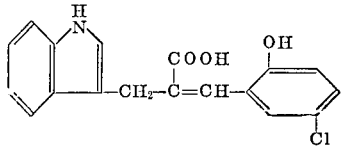

α - (5 - chloro - 2 - hydroxybenzylidene)indole - 3 - propionic acid: This was prepared from 23.8 g. of ethyl α-(triphenylphosphoranylidene)indole - 3 - propionate and 7.8 g. of 5 - chlorosalicylaldehyde in analogous fashion to α - (2 - hydroxy - 3 - methoxybenzylidene)indole - 3-propionic acid. The material was recrystallized from

CH₃CN

M. P. 202–05°; yield 9.5 g. (58%); λ_max. mμ (ε) 222 (50,100), 266 (14,500), 318 (5,900); λ_max. 740 (m.), 810 (mw.), 930 (mw.), 1090 (mw.), 1110 (m.), 1205 (ms.), 1255 (ms.), 1290 (ms.), 1605 (ms.), 1665 (ms.), 3475 (ms.) cm.⁻¹.

*Analysis.*—Calcd. for C₁₈H₁₄ClNO₃ (percent): C, 65.96; H, 4.31; N, 4.27. Found (percent): C, 65.84; H, 4.32; N, 4.12.

EXAMPLE 19

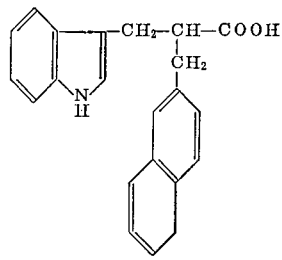

α - [(2 - naphthyl)methyl]indole - 3 - propionic acid: A mixture of 1.5 g. of α-[(2-naphthyl)methylene]indole-3-propionic acid, 50 ml. of abs. ethanol, and 150 mg. of 10% palladium on carbon was reduced at atmospheric pressure and room temperature. Hydrogen uptake was completed in 2 hrs. The mixture was filtered free of catalyst, and the filtrate was concentrated to a gum under reduced pressure. The gum was recrystallized from

CH₃CN

M.P. 150–52°; yield 350 mg. (23%).

*Analysis.*—Calcd. for C₂₂H₁₉NO₂ (percent): C, 80.22; H, 5.81; N, 4.25. Found (percent): C, 80.20; H, 5.73; N, 4.36.

It is understood that the foregoing detailed description is given merely by way of illustration and that many variations may be made therein without departing from the spirit of our invention.

Having described our invention, what we desire to secure by Letters Patent is:

1. The compound trans-p-chloro-α-(indol-3-ylmethyl)-cinnamic acid.

References Cited

Mndzhoyan et al.: Chemical Abstracts, vol. 53, cols. 9196–9197 (1959).

Semonov et al.: Chemical Abstracts, vol. 63, col. 11478 (1965).

Bestmann et al.: Chem. Ber., vol. 95, pp. 2921 to 2927 (1962).

Chemical Abstracts, vol. 51, col. 8681 (1957).

JOHN D. RANDOLPH, Primary Examiner

U.S. Cl. X.R.

260—240 E, 240 K, 326.13, 469, 473, 520, 521